Patented June 30, 1931

1,812,669

UNITED STATES PATENT OFFICE

WILLARD L. VOGEL, OF LOS ANGELES, CALIFORNIA, ASSIGNOR OF ONE-TENTH TO PAUL W. PRUTZMAN

MONOBROM DERIVATIVE OF FLUORESCEIN

No Drawing. Original application filed May 28, 1928, Serial No. 281,355. Divided and this application filed September 24, 1929. Serial No. 394,926.

The object of my invention is to produce a heretofore unknown mono-brom derivative of fluorescein and a heretofore unknown mercuric derivative of the said mono-brom compound. The mercury derivative may in turn be converted into a tetra-salt of an alkali metal, the tetra-sodium salt in particular having highly valuable properties as an antiseptic and therapeutic agent.

My invention comprises three steps: the bromination of fluorescein under such conditions as to produce the mono-brom derivative instead of the di-brom or tetra-brom derivatives heretofore known; the conversion of the mono-brom compound into a di-mercury derivative, and the conversion of the mercury derivative into salt of an alkali metal.

The first step is taken in the following manner. To one molecule of 332 parts by weight of fluorescein I add approximately 660 parts of glacial acetic acid, bring the fluorescein into even suspension and add gradually one molecule or 160 parts by weight of bromin ($Br_2$). Copious fumes of hydrobromic acid are given off and agitation is continued at normal temperature until these fumes cease. The mixture is now allowed to stand for a short time, or until a pasty yellow cake is formed. This operation must be conducted in glass or equivalent vessel.

I next add to the cake about 1,000 parts by weight of water and stir until the cake is broken up, finally adding and intermixing an additional 3,200 parts of water. The thick yellow magma thus produced is then filtered by suction, washed with water, sucked as dry as possible, and finally transferred to a drying dish of porcelain or similar material, over the surface of which it is thinly distributed. The material is then heated on a sand or oil bath to a temperature not to exceed 105° C., the acetic acid which separates being poured off from time to time, and drying continued at the same temperature until a dry material, which, when powdered, is free from the odor of acetic acid, is formed.

The product of the above reaction is mono-brom-fluorescein, $C_{20} H_{11} O_5 Br$, a yellow powder, insoluble in water, melting at 110° C., and having a molecular weight of 411. The yield is approximately 1.1 times the weight of fluorescein taken. The reaction which takes place appears to be represented by the following structural formula, it being understood that I have not determined which one of the three possible positions in the resorcinol ring is occupied by the bromin.

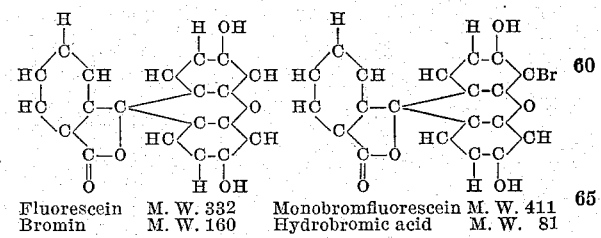

Fluorescein  M. W. 332    Monobromfluorescein M. W. 411
Bromin       M. W. 160    Hydrobromic acid     M. W. 81

This is a division of my co-pending application entitled Mercury bromin derivatives of fluorescein, Serial No. 281,355, filed May 28, 1928.

I claim as my invention:

The herein described product: the mono-brom derivative of fluorescein.

In witness that I claim the foregoing I have hereunto subscribed my name this 23rd day of August, 1929.

WILLARD L. VOGEL.